Figure 1:
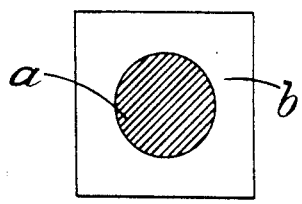

Nov. 18, 1952     E. ZIEGER ET AL     2,618,554

PHOTOGRAPHIC METHOD FOR PRODUCING BOUNDARY LINES

Filed Aug. 3, 1950

Inventors
E. Zieger
L. Frank
Attys.

Patented Nov. 18, 1952

2,618,554

UNITED STATES PATENT OFFICE 2,618,554

PHOTOGRAPHIC METHOD FOR PRODUCING BOUNDARY LINES

Eugene Zieger, Manchester, and Laszlo Frank, Sale, England

Application August 3, 1950, Serial No. 177,423
In Great Britain November 26, 1948

3 Claims. (Cl. 95—5)

In the reproduction of designs by photographic processes using printing rollers or other printing surfaces, it is necessary to provide a contour line or outline around each object in the design in order to ensure that in the reproduction, there shall be a sharp or clear boundary for each object. Such boundary lines or outlines have been produced photographically by preliminarily exposing and developing, without fixing, a negative of the original after which the negative is again exposed through a suitable screen or screens and then developed and fixed. As a result of this process, there appear on the negative thin continuous lines around each object in the design which is transparent.

The object of the present invention is to provide an improved process for producing the continuous boundary lines or outlines and for reproducing in a satisfactory manner any fine lines which may be present in the original design.

In accordance with our invention, we place the original design over the light sensitive surface, with or without a thickness of Celluloid or like transparent material interposed, and then make an exposure at one time for a short period (say 10 seconds) to diffused light and at another for a longer period (say one minute) to a concentrated beam of light, after which the negative is developed and dried but not fixed. It is then exposed again with or without a screen or screens or other shading medium to suit the nature of the design and then developed and fixed. It is then reduced by usual methods in order to clear or "cut" the grey or shaded areas around the objects in the design in the negative which areas become the boundaries.

By the double exposure and using the interposed transparent film between the original design and the sensitive film, we obtain the desired boundary lines or outlines around the objects constituting the design and in addition ensure that any fine lines in the original design are satisfactorily reproduced on the film. If such reproduction is made using diffused light only, it is found that the fine lines may more or less completely disappear in the negative.

By varying the thickness of the interposed transparent sheet, we can vary the thickness of the boundary lines or outlines.

It will be appreciated that during the first developing process, the anti-halation backing on the sensitive film will be dissolved away. We therefore place a suitable anti-halation backing upon the film for the final exposure.

The accompanying explanatory diagrams illustrate the process which constitutes the present invention.

Figure 2:
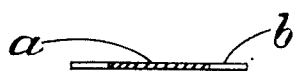

Figure 1 is a plan of a pattern or design which it is desired to reproduce so that there is a continuous boundary round the design. $a$ indicates the portion of the pattern which for convenience will be considered as opaque, the remainder $b$ of the pattern being transparent. Figure 2 is a sectional side elevation of Figure 1.

Figure 3:
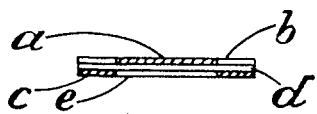
Figure 4:
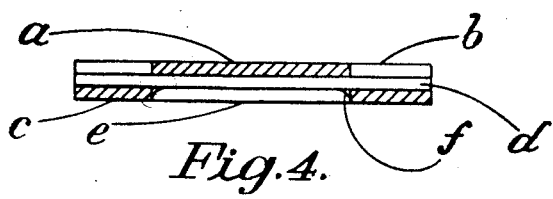

Figure 3 shows the pattern of Figure 2 arranged in conjunction with a light sensitive material $c$ and an interposed thickness $d$ of transparent material. If a concentrated or unidirectional beam of light be projected through the pattern on to the light sensitive material $c$, the part $e$ of the latter will be unexposed and the remainder exposed. If now a diffused light be applied for a short interval of time to the pattern, the effect will as shown in Figure 4 which is drawn to a larger scale expose a part of the unexposed portion $e$ of the light sensitive material so that it becomes shaded or grey. This shaded or grey portion is shown at $f$ and constitutes a border around the pattern transferred to the material $c$ as shown in the plan view Figure 5.

The negative $c$ is now developed and dried and not fixed.

Figure 5:
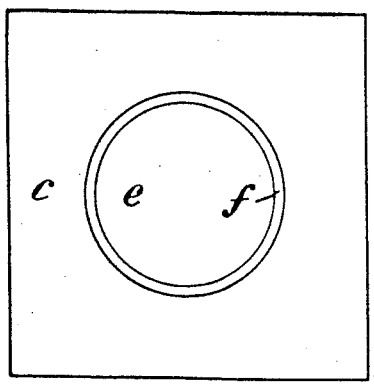

If the negative is now exposed to light through a shading medium or screen, the part $e$ will have the shade lines or pattern printed thereon. The negative is now developed and fixed. It is then reduced by usual methods, e. g. by using ferricyanide and sodium thiosulfite which will clear the shaded or grey area $f$ by removing a sufficient depth of the negative to expose the part which in Figure 4 comes vertically beneath the part $f$ of Figure 4 which is lightly exposed. The result is that the boundary $f$ in Figure 5 is transparent, the part $e$ shaded according to the shading medium used, and the remainder fully exposed.

Thus there is obtained a continuous boundary round any object in the design whilst any fine lines in the design will be reproduced in a satisfactory manner. The thickness of the transparent sheet $d$ which is interposed between the design and the light sensitive material $c$ can be varied in order to increase or diminish the width of the boundary $f$ around any object in the design.

It will be appreciated that the Figures of the drawings are merely intended to assist in the understanding of the process and bear no relation to any actual design or pattern which it would be desired to reproduce or to the dimensions of the boundaries around the objects in the design.

What we claim is:

1. A process for reproducing designs by a photographic process, in which the design is placed over a light sensitive surface with a layer of transparent material interposed, and an exposure is made for a short period of time to diffused light which cuts in behind the edges of the design on the light sensitive surface, the design and light sensitive surface being then exposed for a longer period of time to a unidirectional concentrated beam of light which casts a sharp shadow of the edges of the design on the light sensitive surface, the light sensitive surface being then developed and dried but not fixed, a further exposure being made of the light sensitive surface to a beam of light through a screen but without the design thereon, and then the light sensitive surface is developed and fixed, and subjected to a reducing process which clears the incompletely exposed areas where the diffused light has cut in behind the edges of the design, whereby boundary lines are obtained round the objects constituting the design and fine lines in the original design are satisfactorily reproduced.

2. A process as claimed in claim 1, in which after the first development an anti-halation backing is placed behind the light sensitive material for the final exposure.

3. A process as claimed in claim 2, in which the exposure to diffused light using a layer of transparent material between the design and light sensitive surface is after the exposure to a concentrated beam of light.

EUGENE ZIEGER.
LASZLO FRANK.

REFERENCES CITED

The following references are of record in the file of this patent:

UNITED STATES PATENTS

| Number | Name | Date |
|---|---|---|
| 2,532,701 | Falconer et al. | Dec. 5, 1950 |

FOREIGN PATENTS

| Number | Country | Date |
|---|---|---|
| 650,152 | Germany | Sept. 27, 1937 |